Nov. 30, 1926.  
W. A. ANTILOTTI ET AL  
1,609,099
DEMOUNTABLE RIM
Filed March 27, 1924     2 Sheets-Sheet 1
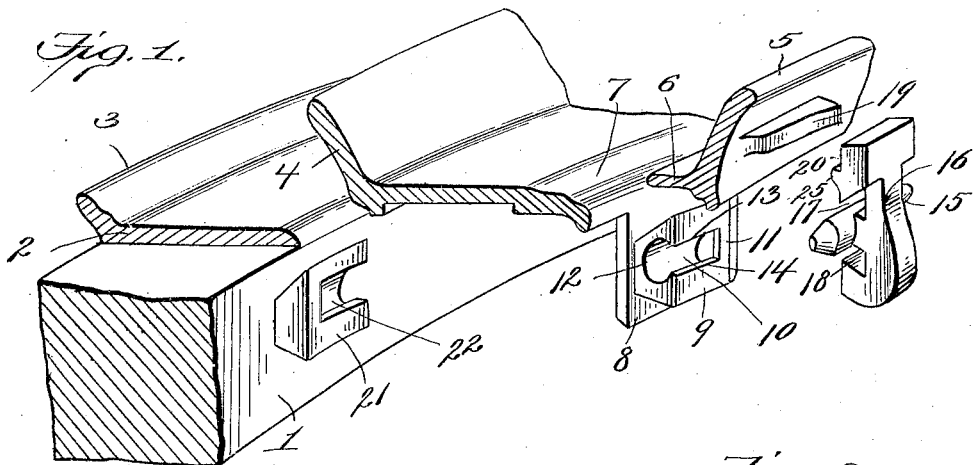
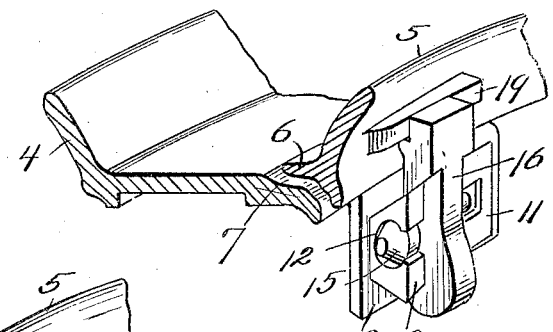
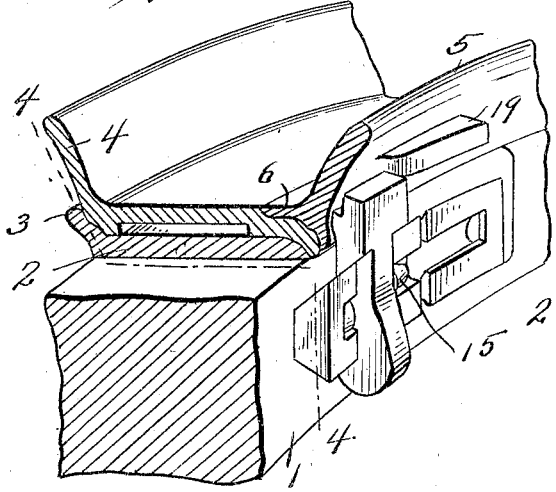
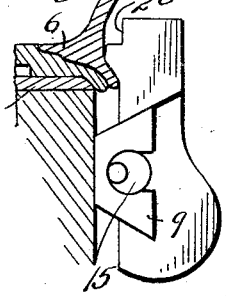
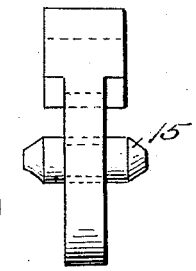
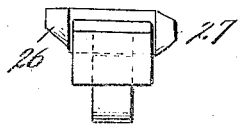
Inventor  
William A. Antilotti  
Edgar C. Jones  
By  
Attorney

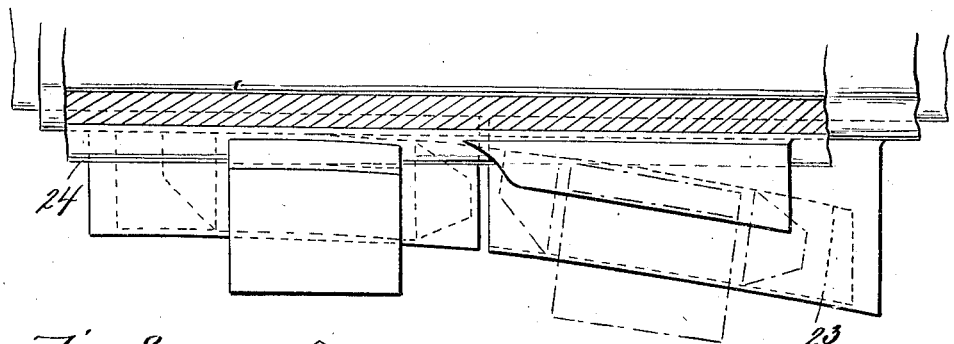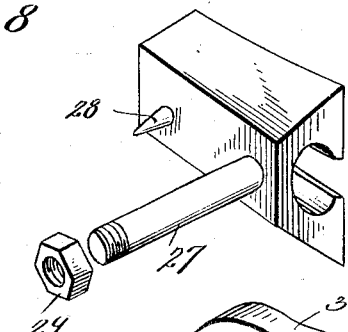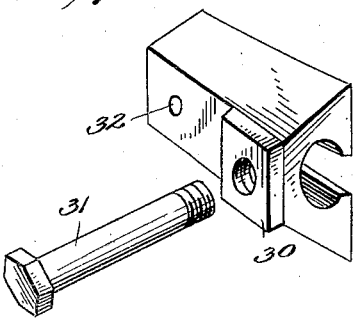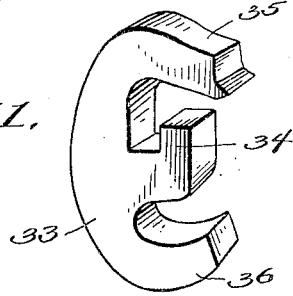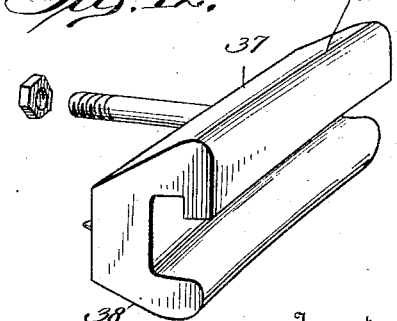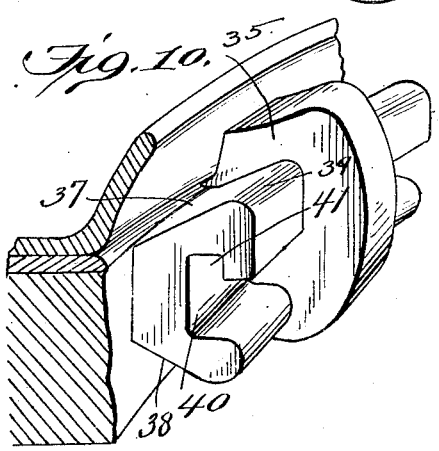

Patented Nov. 30, 1926.

1,609,099

UNITED STATES PATENT OFFICE.

WILLIAM A. ANTILOTTI AND EDGAR C. JONES, OF ATLANTA, GEORGIA.

DEMOUNTABLE RIM.

Application filed March 27, 1924. Serial No. 702,374.

This invention relates to demountable rims of the detachable flange type and has for its principal object the provision of means having, selectively, either the sole function of holding the detachable flange in position upon the rim when the latter is off of the wheel, as when used with a spare tire, or the dual function of simultaneously retaining the flange in place upon the rim and securing the rim to the vehicle wheel.

Other objects of the invention will become manifest as the specification develops. It may be stated, in general, that the principle of operation of the invention is similar in some respects to that of the invention described and claimed in our pending application Serial No. 560,135, filed May 11, 1922, Patent No. 1,524,613, January 27, 1925.

In the accompanying drawings:—

Figure 1 is a view in perspective showing the several parts which constitute the present invention, said parts being shown separated for clarity of illustration.

Figure 2 is a perspective view showing the detachable flange secured to the demountable rim, with the latter removed from the wheel as when carrying a spare tire.

Figure 3 is a view similar to Figure 2 showing the several parts in assembled relation upon the wheel of a vehicle.

Figure 4 is a section taken along the line 4—4 of Figure 3.

Figure 5 is a front elevation of the rim lug.

Figure 6 is a top view of the same.

Figure 7 is a plan view, partly in section, showing the parts assembled in either of the selective positions.

Figure 8 is a perspective view of one form of keeper for the rim lug.

Figure 9 is a view similar to Figure 8 of another form of keeper for the rim lug.

Figure 10 is a perspective view of a modification of the invention.

Figures 11 and 12 are, respectively, perspective views of the lug and keeper used in this modified form of the invention.

Referring now in detail to the several figures, the numeral 1 represents the wooden felly of a vehicle wheel, 2 being the fixed metallic rim secured upon said felly and having a flange 3 at the side thereof next to the vehicle body the purpose of which is to serve as a stop for limiting the movement of the demountable rim toward said body. The demountable rim has a fixed tire flange 4, generally made integral therewith, and a detachable tire flange 5, the latter having a stepped construction 6 on the side remote from its free edge matching with a similar construction 7 formed on the demountable rim.

The demountable rim is formed with a depending portion 8 having a keeper 9. Said keeper is provided with a channel 10 which channel has a curvature concentric with the circumference of the felly, and is also curved laterally outward, the closed end 11 of said channel being farther away from the front face of the felly than is the open end 12. The channel 10 intersects the front face of the keeper 9 in an opening which is less in width than the diameter of the channel so as to provide overhanging edges 13 and 14 which prevent the escape of the bolt 15 carried by the rim lug 16 and which is adapted to slide within said channel. Both circumferential faces of the keeper 9 preferably dove-tail with complementary recesses 17 and 18 respectively, formed in the rim lug 16.

It is obvious that when the rim lug 16 is placed in engagement with the keeper 9, the bolt 15 being within the channel 10, said lug will move from the demountable rim in a direction away from the body when pushed to the right, and will move toward said body when moved to the left.

The detachable flange 5 is formed with a projecting cam track 19 in the path of movement of the lug 16, said lug being formed with a rabbeted face 20 engageable with said cam track. The surface of said cam track and the surface of said rabbeted face may be formed with a curvature concentric with the center of lateral curvature of the channel 10 and the elevation of said cam track is such that, when the detachable flange 5 is in place upon the demountable rim and the bolt 15 of the rim lug is within the channel 10, the face 20 of said lug will make firm engagement with the cooperating face of said cam track. Preferably, the curvature of said cam track is such as to produce a wedging action between the cam track and lug when the latter is forced to an extreme position to the right, that is to say, toward the high portion of said cam track, by being tapped with any suitable tool.

The structure that has just been described, that is to say, the demountable rim, the detachable flange 5, the keeper 9 integral with or secured to the depending portion 8, and the lug 16 when in its right hand position, i. e. toward the high part of the cam track 19, constitutes adequate means for retaining an inflated spare tire in position so that the demountable rim thus assembled may be secured to the carrier which is usually located at the back of the vehicle. A wedging action between the cam track 19 and the lug 16 is, however, unnecessary as the pressure of the side wall of the inflated tire against the detachable flange will hold the cam track 19 firm against the lug 16 preventing displacement of the latter.

The felly 1 is provided with a keeper 21 positioned at a point adjacent to and in line with the keeper 9 when the demountable rim is mounted upon the wheel. The keeper 21 is formed with a channel 22, the latter being a continuation of the channel 10 and having a curvature continuous with the curvature of the former described channel. The continuous curvature is indicated by the dotted line 23 in Figure 7 and it will be observed that when the bolt 15 of the lug 16 travels from the keeper 9 to the keeper 21 it follows a path which carries it well in below the forward edge 24 of the detachable flange.

It will be seen from Figures 1 and 2 that the cut-away portion of the lug 16 which forms the rabbeted face 20, also constitutes a projecting ledge 25 which is so short as to be out of contact with the detachable flange when the face 20 is in contact with the cam track. But when the bolt 15 moves into the channel 22, the face 20 travels out of contact with the cam track 19 due to termination of the latter, whereupon the ledge 25, after slight further movement of the lug 16 in a left hand direction, makes contact with the surface of the detachable flange 5, as in Figure 3, being wedged tightly against said flange by the further descent of said bolt within said channel, the detachable flange 5 and the demountable rim 3 being both thereby clampably secured in position upon the felly. The ends of the channels of both keepers are closed so that when the demountable rim is in place upon the felly as shown in Figure 3 it is impossible for the lug to escape. The operation of the device is simple for it will be understood from Figure 3 that it is only necessary to tap the lug toward the right to release the rim and at the same time to secure the demountable flange to the rim, and to tap the lug to the left hand position, in order to secure both the flange and rim to the felly. When the rim has been removed from the felly the tire is released by tapping the lug toward the left, which procedure will be understood from an inspection of Figure 2.

The ends 26 and 27 of the bolt 15 are preferably tapered, as shown so as to guide the bolt from one channel into the other should they not be in perfect alignment due to incomplete positioning of the rim upon the felly.

The construction of the keepers may vary, one form being shown in Figure 8 in which the body of the keeper is formed with a stud 27' adapted to enter a hole drilled through the felly from one side to the other. The keeper is assembled by fitting the stud into the hole through the felly and then striking it with a hammer so as to drive the pointed projection 28 into the felly. This prevents rotation of the keeper about the stud 27'. The nut 29 screws upon the stud 27' against the side of the felly adjacent the body holding the keeper securely against displacement. Another form of keeper is shown in Figure 9, the body of the keeper being provided with a boss 30 adapted to be countersunk into the felly and having a threaded aperture taking the stud bolt 31. A hole 32 may be formed in said keeper for the reception of a screw which is introduced from within the channel, the function of said screw being the same as that of the pointed projection 28.

In Figures 10 to 12 inclusive I have shown a rim lug adapted to function in a manner quite similar to that described in our aforesaid pending application No. 560,135 Patent No. 1,524,613, but which is characterized by great simplicity and by certain structural improvements which are common to both forms of the invention described in the present specification. This lug, designated by the reference character 33 is preferably formed with a central angular portion 34 which is the functional equivalent of the bolt 15 forming part of the rim lug shown in Figure 1. Above and below the angular portion 34 the rim lug is provided with extensions 35 and 36, said extensions converging toward the rearward side of the rim lug so as to embrace the rearwardly sloping walls 37 and 38 of a keeper 39 in a dove-tailed fashion. This keeper is secured to the felly of the vehicle wheel in any suitable manner and the rim lug cooperates therewith in a way solely for the purpose of securing the demountable rim upon the felly. The keeper is formed with a channel 40 having an upwardly extending recess 41, to receive the angular portion 34 of the rim lug and acting as a runway therefor. The channel 40 with the recess 41 is curved in a manner similar to the channels 10 and 22 of the first form of the invention and the rim lug cooperates with said channel so as to react against the walls of said channel when the rim lug is forced into wedging engagement with the demountable rim. In both forms of the invention, the extensions 35 and 36, and the equivalent structure of the rim lug shown in Figure 1 operate to prevent spreading of the walls of the channels under excessive strain which might be brought about by wedging the rim lug too tightly against the demountable rim.

The operation of the form of the invention shown in Figures 10 to 12 is similar to that of the invention embraced in the subject matter of our aforesaid application and also to the operation of the modification of the invention above described it being merely necessary to tap the lug toward the right in order to cause it to ride out from the demountable rim or to reverse the operation for the purpose of tightening the lug against the rim. It is to be understood that in both forms of the invention a plurality of the fastening devices are generally used being arranged at equal intervals about the felly of the wheel.

While we have above described what we have found to be a very practical embodiment of our invention, it is nevertheless to be understood that the demountable rim may also be exemplified in numerous other alternative constructions and we accordingly reserve the right of adopting all such legitimate changes as may be fairly embodied within the spirit and scope of the invention as claimed.

Having described our invention what we claim as new and desire to secure by Letters Patent, is:—

1. In combination with the felly of a vehicle wheel, a demountable rim therefor, a detachable flange for said rim, keepers carried respectively by said felly and rim, and means selectively engageable with one or the other of said keepers, and with said flange, for retaining said flange upon said rim and said rim upon said felly, or performing the sole function of retaining said flange upon said rim.

2. In combination, a felly and a demountable rim therefor, a detachable flange for said rim, and a plurality of fastening devices each comprising keepers carried by said rim and felly and provided with aligning channels curved laterally away from said felly in one direction, a lug having a bolt slidably housed within said channels and movable with said lug from one channel to the other, said lug having a portion engageable with said detachable flange when the bolt is in either channel.

3. In combination, a felly and a demountable rim therefor, a detachable flange for said rim, and a plurality of fastening devices each comprising keepers carried by said rim and felly and provided with aligning channels curved laterally away from said felly in one direction, a lug having a bolt slidably housed within said channels, the latter being formed so as to prevent escape of said bolt, said lug having a portion engageable with the detachable flange when the bolt is in one channel to simultaneously wedge said rim to said felly and said flange to said rim, and having another portion engageable with said flange when the bolt is in the other channel to perform the sole function of holding said flange upon said rim.

4. In combination, a felly and a demountable rim therefor, a detachable flange for said rim, said rim having a plurality of projecting tracks, at spaced intervals, and a plurality of fastening devices each comprising keepers carried by said rim and felly and provided with aligning channels curved laterally away from said felly in one direction, a lug having a bolt slidably housed within said channels, the latter being formed to prevent escape of said bolt, said lug having a portion engageable with the detachable flange when the bolt is in one channel to simultaneously wedge said rim to said felly and said flange to said rim, and having another portion engageable with one of said cam tracks of said flange when the bolt is in the other channel to perform the sole function of holding said flange upon said rim.

5. In combination, a felly and a demountable rim therefor, and a detachable flange for said rim formed with cam tracks at spaced intervals, a plurality of fastening devices each comprising keepers carried by said rim and felly and provided with aligning channels curved laterally away from said felly in one direction, a lug having a bolt slidably housed within said channels, the latter being formed to prevent escape of said bolt. said lug having a portion engageable with the detachable flange when the bolt is in one channel to simultaneously wedge said rim to said felly and said flange to said rim, and having another portion engageable with one of said cam tracks when the bolt is in the other channel for the sole purpose of holding said flange upon said rim, said cam tracks having a curvature substantially concentric with the curvature of said channels.

6. In combination with the felly of a vehicle wheel, a demountable rim therefor, and a detachable flange for said rim, a plurality of fastening devices each comprising keepers carried by said felly and rim said keepers being formed with channels curved laterally away from said felly in one direction and closed at their outer ends, said rim being adapted to be mounted upon said felly with the open ends of said channels in alignment, and a lug having a bolt slidably housed within said channels, the latter being formed to prevent lateral escape of said bolt, said lug having a portion engageable with said detachable flange when the bolt is in one channel to simultaneously wedge said rim to said felly, and said flange to said rim, and having another portion engageable with said flange when the bolt is in the other channel, to perform the sole function of holding the flange upon said rim.

7. In combination, a felly and a demountable rim therefor, a plurality of fastening devices for said demountable rim each comprising a keeper carried by said felly, and provided with a channel curved laterally away from said felly in one direction, the upper and lower sides of said keeper converging toward said felly, a lug having a bolt slidably housed within said channel and movable in one direction to wedge said rim to said felly, said lug being formed with portions engaging the converging sides of said keeper to prevent spreading of the walls of said channel.

In testimony whereof we have hereunto set our hands.

WILLIAM A. ANTILOTTI.
EDGAR C. JONES.